United States Patent

Worrall

(10) Patent No.: US 11,720,769 B2
(45) Date of Patent: Aug. 8, 2023

(54) METHODS AND SYSTEMS FOR ENHANCING RASTER IMAGE PROCESSING USING ARTIFICIAL INTELLIGENCE

(71) Applicant: Global Graphics Software Limited, Cambridge (GB)

(72) Inventor: Eric Worrall, Cambridgeshire (GB)

(73) Assignee: GLOBAL GRAPHICS SOFTWARE LIMITED, Cambridge (GB)

(*) Notice: Subject to any disclaimer, the term of this patent is extended or adjusted under 35 U.S.C. 154(b) by 14 days.

(21) Appl. No.: 17/338,200

(22) Filed: Jun. 3, 2021

(65) Prior Publication Data

US 2022/0391649 A1 Dec. 8, 2022

(51) Int. Cl.
*G06K 15/02* (2006.01)
*G06N 20/00* (2019.01)
*G06F 3/12* (2006.01)
*H04N 1/00* (2006.01)

(52) U.S. Cl.
CPC ....... *G06K 15/1823* (2013.01); *G06F 3/1204* (2013.01); *G06F 3/1205* (2013.01); *G06F 3/1215* (2013.01); *G06F 3/1237* (2013.01); *G06K 15/1805* (2013.01); *G06N 20/00* (2019.01); *H04N 1/00395* (2013.01); *H04N 1/00962* (2013.01); *G06F 3/1206* (2013.01); *G06F 3/1279* (2013.01)

(58) Field of Classification Search
None
See application file for complete search history.

(56) References Cited

U.S. PATENT DOCUMENTS

| | | | |
|---|---|---|---|
| 2002/0067498 A1* | 6/2002 | Chapman | G06F 3/1204 358/1.12 |
| 2004/0085558 A1* | 5/2004 | Minns | G06K 15/1823 358/1.11 |
| 2005/0190383 A1* | 9/2005 | Levin | G06F 3/1214 358/1.15 |
| 2020/0379690 A1* | 12/2020 | Ishi | G06K 15/1836 |
| 2021/0289106 A1* | 9/2021 | Tsutsui | G06N 20/00 |
| 2022/0058454 A1* | 2/2022 | Hasegawa | G06K 15/1836 |
| 2022/0180114 A1* | 6/2022 | Achiwa | G06V 30/164 |

FOREIGN PATENT DOCUMENTS

KR 2020-0135102 A * 12/2020 ............ G06N 3/0454

OTHER PUBLICATIONS

KR-2020-0135102-A English Translation, Lee Cheon et al., par 0065-0066 (p. 6 highlighted area of English Translation) (Year: 2020).*

* cited by examiner

*Primary Examiner* — Miya J Cato
(74) *Attorney, Agent, or Firm* — Branch Partners PLLC; Bruce E. Black

(57) ABSTRACT

A method for configuring a raster image processor (RIP) for a digital printing system includes receiving a file for a print job; receiving or determining job characteristics of the print job or the file for the print job; receiving or determining hardware characteristics of hardware upon which the RIP is operating; inputting the job characteristics and the hardware characteristics into a trained artificial intelligence (AI) module; and selecting, using the trained AI module, a configuration or settings for the RIP for processing of the file based on the plurality of job characteristics and the plurality of hardware characteristics.

20 Claims, 2 Drawing Sheets

METHODS AND SYSTEMS FOR ENHANCING RASTER IMAGE PROCESSING USING ARTIFICIAL INTELLIGENCE

FIELD

The present invention is directed to the area of raster image processing. The present invention is also directed to methods and systems for enhancing raster image processing using artificial intelligence.

BACKGROUND

Some of the last processes before delivering data to the printing device to print are those which are often performed within the Digital Front End (DFE) for the printing device. These processes may include one or more of the following: interpretation of the print stream (for example, data in a PDF or PostScript format), color management, rendering to a raster format, or application of halftone screening. These processes transform the supplied data from a format designed for interchange between devices into raster data that can be delivered to the press marking engine (for example, a drum or inkjet heads). These processes, or a subset thereof, are performed by a RIP ("Raster Image Processor) which may include one or more processors and may include one or more software products.

There are a wide variety of different print jobs with different printing parameters or requirements. RIPs are generally software products that are configured to run on a variety of different hardware configurations. Conventionally, the RIP configuration is often chosen to work for a range of print jobs and may be modified to specific hardware.

BRIEF SUMMARY

One embodiment is a method for configuring a raster image processor (RIP) for a digital printing system. The method includes receiving a file for a print job; receiving or determining a plurality of job characteristics of the print job or the file for the print job; receiving or determining a plurality of hardware characteristics of hardware upon which the RIP is operating; inputting the plurality of job characteristics and the plurality of hardware characteristics into a trained artificial intelligence (AI) module; and selecting, using the trained AI module, a configuration or settings for the RIP for processing of the file based on the plurality of job characteristics and the plurality of hardware characteristics.

In at least some embodiments, the method further includes determining, using the trained AI module, an estimated time for processing of the file using the RIP with the selected configuration or settings. In at least some embodiments, the method further includes measuring an actual time for the processing of the file using the RIP with the selected configuration or settings. In at least some embodiments, the method further includes training the trained AI module using the estimated time, the actual time, and the selected configuration or settings.

In at least some embodiments, the hardware characteristics include at least one of the following: operating system; clock speed or overclocked speed of a central processing unit of the hardware; number of physical cores of the hardware; memory size; memory speed; disk speed; model of mother board of the hardware; use of graphics processing unit; clock speed of graphics processing unit; or any combination thereof.

In at least some embodiments, the job characteristics include at least one of the following: number of pages of the print job; size of the file; format of the file; size or amount of graphical information in the file; size or amount of vector information in the file; use of variable data processing; number of color conversions; resolution of output; resolution of images in the file; or any combination thereof.

In at least some embodiments, the method further includes processing the file using the RIP with the selected configuration or settings.

Another embodiment is a system for configuring a raster image processor (RIP) for a digital printing system. The system includes at least one processor comprising a trained artificial intelligence (AI) module and configured and arranged to perform actions, the actions including receiving a file for a print job; receiving or determining a plurality of job characteristics of the print job or the file for the print job; receiving or determining a plurality of hardware characteristics of hardware upon which the RIP is operating; inputting the plurality of job characteristics and the plurality of hardware characteristics into the AI module; and selecting, using the trained AI module, a configuration or settings for the RIP for processing of the file based on the plurality of job characteristics and the plurality of hardware characteristics.

In at least some embodiments, the actions further include determining, using the trained AI module, an estimated time for processing of the file using the RIP with the selected configuration or settings. In at least some embodiments, the actions further include measuring an actual time for the processing of the file using the RIP with the selected configuration or settings. In at least some embodiments, the actions further include training the trained AI module using the estimated time, the actual time, and the selected configuration or settings.

In at least some embodiments, the hardware characteristics include at least one of the following: operating system; clock speed or overclocked speed of a central processing unit of the hardware; number of physical cores of the hardware; memory size; memory speed; disk speed; model of mother board of the hardware; use of graphics processing unit; clock speed of graphics processing unit; or any combination thereof.

In at least some embodiments, the job characteristics include at least one of the following: number of pages of the print job; size of the file; format of the file; size or amount of graphical information in the file; size or amount of vector information in the file; use of variable data processing; number of color conversions; resolution of output; resolution of images in the file; or any combination thereof.

A further embodiment is a non-transitory computer-readable medium having processor-executable instructions for configuring a raster image processor (RIP) for a digital printing system, the processor-executable instructions when installed onto a device enable the device to perform actions, the actions including receiving a file for a print job; receiving or determining a plurality of job characteristics of the print job or the file for the print job; receiving or determining a plurality of hardware characteristics of hardware upon which the RIP is operating; inputting the plurality of job characteristics and the plurality of hardware characteristics into a trained artificial intelligence (AI) module; and selecting, using the trained AI module, a configuration or settings for the RIP for processing of the file based on the plurality of job characteristics and the plurality of hardware characteristics.

In at least some embodiments, the actions further include determining, using the trained AI module, an estimated time for processing of the file using the RIP with the selected configuration or settings. In at least some embodiments, the actions further include measuring an actual time for the processing of the file using the RIP with the selected configuration or settings. In at least some embodiments, the actions further include training the trained AI module using the estimated time, the actual time, and the selected configuration or settings.

In at least some embodiments, the hardware characteristics include at least one of the following: operating system; clock speed or overclocked speed of a central processing unit of the hardware; number of physical cores of the hardware; memory size; memory speed; disk speed; model of mother board of the hardware; use of graphics processing unit; clock speed of graphics processing unit; or any combination thereof.

In at least some embodiments, the job characteristics include at least one of the following: number of pages of the print job; size of the file; format of the file; size or amount of graphical information in the file; size or amount of vector information in the file; use of variable data processing; number of color conversions; resolution of output; resolution of images in the file; or any combination thereof.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of raster image processing. The present invention is also directed to methods and systems for enhancing raster image processing using artificial intelligence.

Figure 1:
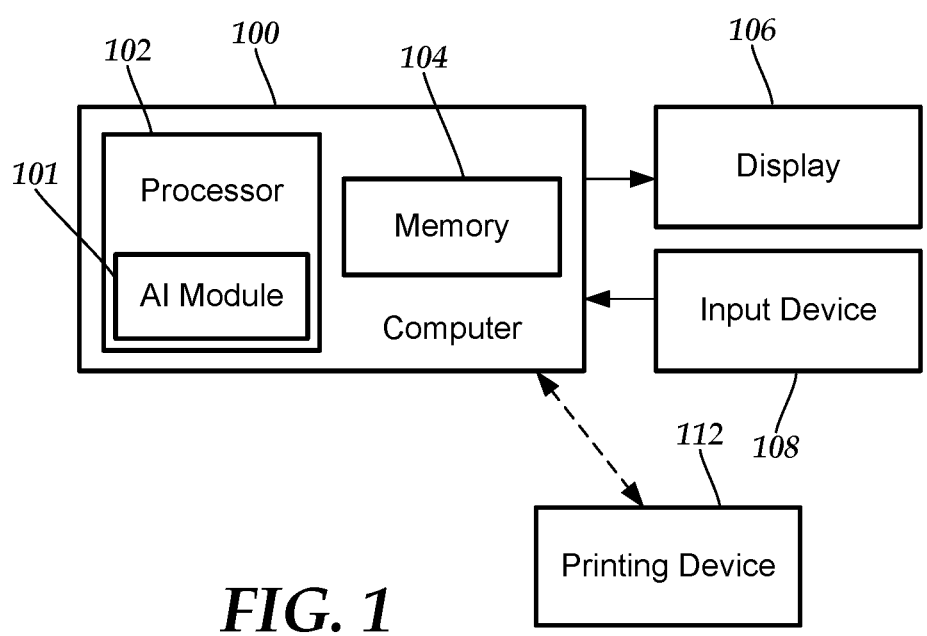
FIG. 1 is a schematic block diagram of one embodiment of a system for processing documents for printing, according to the invention.

FIG. 1 illustrates one embodiment of a system for practicing the invention. The system can include a computer 100 or any other device that includes a processor 102 and a memory 104, a display 106, an input device 108, and a printing device 112, such as a printer or press. The printing device 112 can be a digital press (for example, electrophotographic or inkjet presses), an inkjet device, a laser printing device, or any other suitable digital printing device or system. In at least some embodiments, the methods and systems described herein may be suitable for use with a conventional press (for example, (offset lithographic, flexographic, or gravure presses). Unless otherwise indicated, the terms "printing device" and "press" are used interchangeably herein. In some embodiments, one or more of the computer 100, display 106, or input device 108 can be part of the printing device 112.

The computer 100 can be a laptop computer, desktop computer, server computer, tablet, mobile device, smartphone, or other devices that can run applications or programs, or any other suitable device for processing information and for presenting a user interface. Alternatively or additionally, the computer 100 can be part of the printing device 112 or coupled (by wired or wireless coupling) to the printing device. The computer 100 can be local to the user or can include components that are non-local to the user including one or both of the processor 102 or memory 104 (or portions thereof). For example, in some embodiments, the user may operate a terminal that is connected to a non-local computer. In other embodiments, the memory can be non-local to the user.

The computer 100 can utilize any suitable processor 102 including one or more hardware processors that may be local to the user or non-local to the user or other components of the computer. The processor 102 is configured to execute instructions provided to the processor, as described below. The processor 102 can include an artificial intelligence (AI) module 101, as described in more detail below.

Any suitable memory 104 can be used for the computer 100. The memory 104 illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer. The memory 104 can store instructions for the processor including instructions for the AI module 101.

Communication methods provide another type of computer readable media; namely communication media. Communication media typically embodies computer-readable instructions, data structures, program modules, or other data in a modulated data signal such as a carrier wave, data signal, or other transport mechanism and include any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

The display 106 can be any suitable display device, such as a monitor, screen, display, or the like. The input device 108 can be, for example, a keyboard, mouse, touch screen, track ball, joystick, voice recognition system, or any combination thereof, or the like and can be used by the user to interact with a user interface.

RIPs (Raster Image Processors) are used to convert the file for a print job to one or more rasters for printing. The RIP can perform processes such as, but not limited to, interpretation of the file (for example, a file in a PDF or PostScript format or in the format of another page description language), color management, rendering to a raster format (for example, a bitmap), or screening (for example, halftone screening) or the like or any combination thereof. To enhance the performance, a RIP is ideally configured based on the requirements and characteristics of the print job. In addition, the RIP is also ideally configured based on the hardware that the RIP runs on. For example, at least some print jobs run on specific hardware would benefit from more threads being allocated to RIPing than to, for example, screening.

As an example, some print jobs include variable data printing (VDP), as described for example, in U.S. patent application Ser. No. 17/199,147, incorporated herein by reference in its entirety, and the RIP is ideally configured for VDP. Variable data printing is used to produce series of printed products where each one of that series differs slightly from the others, for example, printing different names, addresses, or graphics on an envelope, postcard, or targeted advertisement. In at least some instances of variable data printing, graphics or combinations of graphics are identified that are used multiple times in the print job and rendered only once. These graphics are then recomposited with graphics that are only used once during processing to produce the raster.

Conventionally, a RIP configuration is often chosen to work for a range of print jobs and may be modified to specific hardware. However, when the hardware changes or a print job from a different source is received, the RIP may not be optimally or ideally configured. Often, with experimentation by an operator, the RIP configuration and the threads can be modified to optimize or enhance the operation of the RIP for the new hardware or print job. However, such an experimentation can be time-consuming or waste resources.

In contrast to these conventional arrangements and methods of operation, methods and systems are described herein in which a printing system analyses the print job and knows the hardware on which the RIP runs. The system uses this information to determine a configuration for the RIP processing the print job on the hardware.

Figure 2:
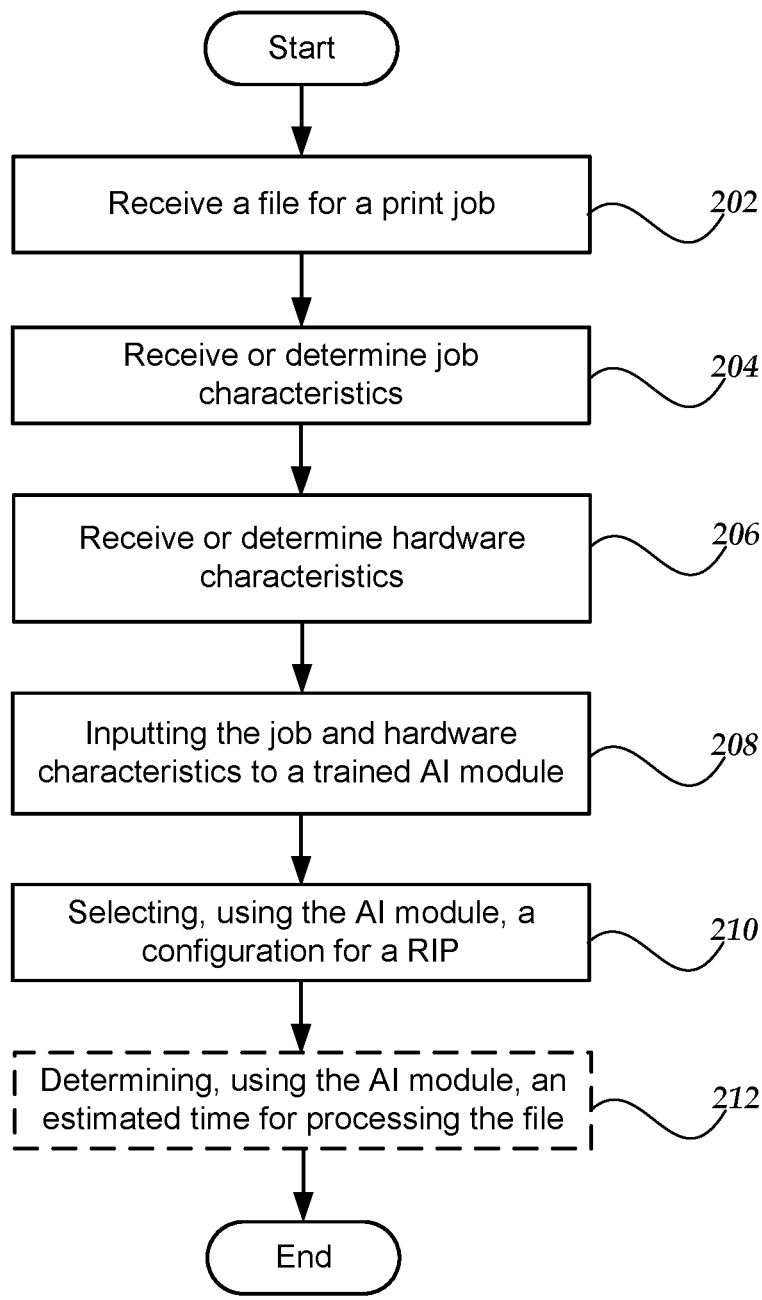
FIG. 2 is a schematic flowchart of one embodiment of a method of configuring a raster image processor (RIP) for a digital printing system, according to the invention.

FIG. 2 illustrates one embodiment of a method for determining a configuration for a RIP of a digital printing system. In step 202, the system receives a file (or multiple files) for the print job. The files can be provided in any suitable format (for example, a PDF or PostScript) format.

In step 204, the system receives, determines, or collects a set of job characteristics about the specific print job or the file. These characteristics can include those relating to the complexity of processing or rendering (which can be related to the processor capacity) and the use of memory (for example, moving or storing rasters). Examples of characteristics of the print job or file include one or more of the following: size of the print job (for example, the number of pages, the size of the file, the size of the individual pages, or the like or any combination thereof); the software used to create the file (for example, the structure created by a particular creator may be slow or fast) and the version of the software; the type or format of the data file for the print job (for example, a PDF or PostScript format); the size or amount of graphical information (e.g., rasters) in the print job or file; the size or amount of vector information in the print job or file; the complexity of the transparency in the print job or file; the number or amount of color conversions; the resolution of the output raster; the resolution of the input images in the file; the performance impact of a series of operations performed in processing the print job; an amount or ratio of vector content (compared, for example, to raster data) in the print job or file or in a page of the print job or file; or the like or any combination thereof.

In step 206, the system receives, determines, or collects of a set of characteristics about the hardware on which the RIP is running. For example, the hardware can include the computer 100 or printing device 112 of FIG. 1. Examples of characteristics of the hardware include one or more of the following: operating system (e.g., Windows or Linux); CPU (central processing unit, such as processor 102 of FIG. 1) clock speed or overclocked CPU speed; number of physical cores; use of multi-threading (e.g., virtual cores); memory size (e.g., RAM size); memory speed; disk speed (particularly if some information is saved to disk); model of mother board; GPU (graphics processing unit) clock speed or overclocked speed; other CPU or GPU characteristics; or the like or any combination thereof. In at least some embodiments, the system can facilitate use of the CPU clock speed to speed up single threads. In at least some embodiments, the presence of multiple cores can improve or facilitate multi-thread performance. In at least some embodiments, the size or speed of the memory may limit or facilitate processing. For example, if the hardware may be CPU or core limited, but with fast memory, then the system may choose to cache images (particularly images that are utilized multiple times in the print job). As another example, if the memory is limited, but the CPU or cores are relatively fast, then the system may limit caching of images and let the cores/CPU process the images.

The number of characteristics of the print job and the hardware is relatively large and provides a relatively large parameter space for adjustment. In step 208, the system inputs a set of the job and hardware characteristics into a trained artificial intelligence (AI) module to facilitate selecting the configuration for the RIP. The term "module" is used interchangeably with terms such as "engine", and "algorithm" unless otherwise indicated.

Any suitable trained AI module can be used and trained using any suitable training or machine learning technique(s). Examples of machine learning techniques and AI modules include, but are not limited to, supervised and unsupervised machine learning techniques and AI modules, such as, for example, Bayesian networks, support vector machines (SVMs), artificial neural networks, genetic algorithms, function predictors, or the like. The machine learning techniques and AI modules may utilize classification, regression, back-propagation, or the like.

In at least some embodiments, the AI module includes a machine learning module to permit a user to further train or otherwise modify the AI module. In other embodiments, the AI module is the result of training, but does not include a training module to provide further training. In at least some embodiments, the training can include providing one or more sets of job and hardware characteristics, as well as RIP configurations and times for processing files. In at least some embodiments, the AI module can be based on a parameterized model that utilizes the job and hardware characteristics as input and parameters that are determined and refines using the training sets. In at least some embodiments, the machine learning can be centralized in the cloud.

In step 210, the AI selects a configuration or settings of the RIP for processing the file of the print job. As an example, the AI can be used to select a configuration or settings for the management of elements such as thread allocation and memory usage. Examples of RIP configuration settings that can be selected, set, or modified by the AI: the use of caching for variable data printing; the number of threads for specific RIP processes (e.g., parsing PDF, compositing, or the like);

the number of threads for the RIP (for example, for vector or raster operations); the number of threads for screening (for example, halftone processing); the number of threads for packing (getting the raster ready to send to the hardware); or the like or any combination thereof. As an example, in at least some embodiments, different print jobs can result in a different allocation of threads in the direct pipeline or turning on a specific performance feature.

In at least some embodiments, in step 212, an estimated time (or speed) for processing is determined by the AI module. In at least some embodiments, the AI can continue to learn based on real world capture of the selected configuration or settings and a difference between the estimated and achieved time (or speed) for the processing of the file of the print job.

In at least some embodiments, data from the two areas of variability for the RIP (the print job and the hardware) can be captured and the AI can be used to predict RIP configuration to improve or enhance throughput for specific hardware and specific print jobs, instead of the conventional "one-size-fits-all" approach.

The methods and systems described herein may be embodied in many different forms and should not be construed as limited to the embodiments set forth herein. Accordingly, the methods and systems described herein may take the form of an entirely hardware embodiment, an entirely software embodiment or an embodiment combining software and hardware aspects. Systems referenced herein typically include memory and typically include methods for communication with other devices including mobile devices. Methods of communication can include both wired and wireless (e.g., RF, optical, or infrared) communications methods and such methods provide another type of computer readable media; namely communication media. Wired communication can include communication over a twisted pair, coaxial cable, fiber optics, wave guides, or the like, or any combination thereof. Wireless communication can include RF, infrared, acoustic, near field communication, Bluetooth™, or the like, or any combination thereof.

It will be understood that each block of the flowchart illustrations, and combinations of blocks in the flowchart illustrations and methods disclosed herein, can be implemented by computer program instructions. These program instructions may be provided to a processor to produce a machine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computer system. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

The above specification provides a description of the manufacture and use of the invention. Since many embodiments of the invention can be made without departing from the spirit and scope of the invention, the invention also resides in the claims hereinafter appended.

What is claimed as new and desired to be protected is:

1. A method for configuring a raster image processor (RIP) for a digital printing system, the method comprising:
   receiving a file for a print job;
   receiving or determining a plurality of job characteristics of the print job or the file for the print job, wherein the job characteristics include at least one of the following: size or amount of graphical information in the file; size or amount of vector information in the file; resolution of images in the file; number of color conversions; complexity of transparency in the file; use of variable data; or any combination thereof;
   receiving or determining a plurality of hardware characteristics of hardware upon which the RIP is operating;
   inputting the plurality of job characteristics and the plurality of hardware characteristics into a trained artificial intelligence (AI) module; and
   selecting, using the trained AI module, at least one setting for the RIP for processing of the file based on the plurality of job characteristics and the plurality of hardware characteristics, wherein the at least one setting comprises use of caching for variable data printing or a number of threads for performing one or more of the following: parsing a PDF document of the print job, compositing, vector operations, raster operations, or packing.

2. The method of claim 1, further comprising determining, using the trained AI module, an estimated time for processing of the file using the RIP with the selected at least one setting.

3. The method of claim 2, further comprising measuring an actual time for the processing of the file using the RIP with the selected at least one setting and training the trained AI module using the estimated time, the actual time, and the selected at least one setting.

4. The method of claim 1, wherein the hardware characteristics include at least one of the following: operating system; clock speed or overclocked speed of a central processing unit of the hardware; number of physical cores of the hardware; memory size; model of mother board of the hardware; or any combination thereof.

5. The method of claim 1, wherein the job characteristics further include at least one of the following: number of pages of the print job; size of the file; format of the file; resolution of output; or any combination thereof.

6. The method of claim 1, further comprising processing the file using the RIP with the selected at least one setting.

7. The method of claim 1, wherein the hardware characteristics include at least one of the following: memory speed; disk speed; clock speed of a graphics processing unit; or any combination thereof.

8. A system for configuring a raster image processor (RIP) for a digital printing system, the system comprising:
   at least one processor comprising a trained artificial intelligence (AI) module and configured and arranged to perform actions, the actions comprising:
   receiving a file for a print job;
   receiving or determining a plurality of job characteristics of the print job or the file for the print job, wherein the job characteristics include at least one of the following: size or amount of graphical information in the file; size or amount of vector information in the file; resolution of images in the file; number of color conversions; complexity of transparency in the file; use of variable data; or any combination thereof;

receiving or determining a plurality of hardware characteristics of hardware upon which the RIP is operating;

inputting the plurality of job characteristics and the plurality of hardware characteristics into the AI module; and selecting, using the trained AI module, at least one setting a configuration or settings for the RIP for processing of the file based on the plurality of job characteristics and the plurality of hardware characteristics, wherein the at least one setting comprises use of caching for variable data printing or a number of threads for performing one or more of the following: parsing a PDF document of the print job, compositing, vector operations, raster operations, or packing.

9. The system of claim 8, wherein the actions further comprise determining, using the trained AI module, an estimated time for processing of the file using the RIP with the selected at least one setting.

10. The system of claim 8, wherein the actions further comprise measuring an actual time for the processing of the file using the RIP with the selected at least one setting and training the trained AI module using the estimated time, the actual time, and the selected at least one setting.

11. The system of claim 8, wherein the hardware characteristics include at least one of the following: operating system; clock speed or overclocked speed of a central processing unit of the hardware; number of physical cores of the hardware; memory size; model of mother board of the hardware; or any combination thereof.

12. The system of claim 8, wherein the job characteristics further include at least one of the following: number of pages of the print job; size of the file; format of the file; resolution of output;

or any combination thereof.

13. The system of claim 8, wherein the hardware characteristics include at least one of the following: memory speed; disk speed; clock speed of a graphics processing unit; or any combination thereof.

14. A non-transitory computer-readable medium having processor-executable instructions for configuring a raster image processor (RIP) for a digital printing system, the processor-executable instructions when installed onto a device enable the device to perform actions, the actions comprising:

receiving a file for a print job;

receiving or determining a plurality of job characteristics of the print job or the file for the print job, wherein the job characteristics include at least one of the following: size or amount of graphical information in the file; size or amount of vector information in the file; resolution of images in the file; number of color conversions; complexity of transparency in the file; use of variable data; or any combination thereof;

receiving or determining a plurality of hardware characteristics of hardware upon which the RIP is operating;

inputting the plurality of job characteristics and the plurality of hardware characteristics into a trained artificial intelligence (AI) module; and selecting, using the trained AI module, at least one setting for the RIP for processing of the file based on the plurality of job characteristics and the plurality of hardware characteristics, wherein the at least one setting comprises use of caching for variable data printing or a number of threads for performing one or more of the following: parsing a PDF document of the print job, compositing, vector operations, raster operations, or packing.

15. The non-transitory computer-readable medium of claim 14, wherein the actions further comprise determining, using the trained AI module, an estimated time for processing of the file using the RIP with the selected at least one setting.

16. The non-transitory computer-readable medium of claim 14, wherein the actions further comprise processing the file using the RIP with the selected at least one setting.

17. The non-transitory computer-readable medium of claim 16, wherein the actions further comprise measuring an actual time for the processing of the file using the RIP with the selected at least one setting and training the trained AI module using the estimated time, the actual time, and the selected at least one setting.

18. The non-transitory computer-readable medium of claim 14, wherein the hardware characteristics include at least one of the following: operating system; clock speed or overclocked speed of a central processing unit of the hardware; number of physical cores of the hardware; memory size; model of mother board of the hardware; or any combination thereof.

19. The non-transitory computer-readable medium of claim 14, wherein the job characteristics further include at least one of the following: number of pages of the print job; size of the file; format of the file; resolution of output; or any combination thereof.

20. The non-transitory computer-readable medium of claim 14, wherein the hardware characteristics include at least one of the following: memory speed; disk speed; clock speed of a graphics processing unit; or any combination thereof.

* * * * *